US012811147B2

(12) United States Patent
Nagai et al.

(10) Patent No.: US 12,811,147 B2
(45) **Date of Patent: *Nov. 24, 2026**

(54) POSITIVE ELECTRODE COMPOSITION, POSITIVE ELECTRODE, AND BATTERY

(71) Applicant: Denka Company Limited, Tokyo (JP)

(72) Inventors: Tatsuya Nagai, Tokyo (JP); Yuma Kitae, Tokyo (JP); Tetsuya Ito, Tokyo (JP)

(73) Assignee: Denka Company Limited, Tokyo (JP)

(*) Notice: Subject to any disclaimer, the term of this patent is extended or adjusted under 35 U.S.C. 154(b) by 378 days.

This patent is subject to a terminal disclaimer.

(21) Appl. No.: 18/572,178

(22) PCT Filed: Jun. 14, 2022

(86) PCT No.: PCT/JP2022/023821

§ 371 (c)(1),
(2) Date: Dec. 19, 2023

(87) PCT Pub. No.: WO2022/270361

PCT Pub. Date: Dec. 29, 2022

(65) Prior Publication Data

US 2024/0290971 A1 Aug. 29, 2024

(30) Foreign Application Priority Data

Jun. 25, 2021 (JP) ................................ 2021-105662

(51) Int. Cl.
*H01M 4/583* (2010.01)
*H01M 4/02* (2006.01)

(52) U.S. Cl.
CPC ...... *H01M 4/583* (2013.01); *H01M 2004/021* (2013.01); *H01M 2004/028* (2013.01)

(58) Field of Classification Search
CPC ..................................................... H01M 4/583
See application file for complete search history.

(56) References Cited

U.S. PATENT DOCUMENTS

2006/0186383 A1 8/2006 Matsuki et al.
2011/0217229 A1 9/2011 Inomata et al.
(Continued)

FOREIGN PATENT DOCUMENTS

CN 1829776 A 9/2006
CN 102165022 A 8/2011
(Continued)

OTHER PUBLICATIONS

The International Bureau of WIPO, International Preliminary Report on Patentability issued in International Application No. PCT/JP2022/023821 (Jan. 4, 2024).

(Continued)

*Primary Examiner* — Brian R Ohara
(74) *Attorney, Agent, or Firm* — Leydig, Voit & Mayer, Ltd.

(57) ABSTRACT

A positive electrode composition containing carbon black, carbon nanotubes, an active material, and a binding material, in which the carbon black has a BET specific surface area of 100 to 400 $m^2/g$ and a crystallite size (Lc) of 15 to 26 Å, the carbon nanotubes have an average diameter of 5 to 15 nm, and a ratio (average diameter/BET specific surface area) of the average diameter with respect to a BET specific surface area of the carbon nanotubes is 0.01 to 0.068 $nm/(m^2/g)$.

7 Claims, 1 Drawing Sheet

(56) References Cited

U.S. PATENT DOCUMENTS

| | | | | |
|---|---|---|---|---|
| 2012/0171566 | A1 | 7/2012 | Yoshitake et al. | |
| 2013/0130113 | A1 | 5/2013 | Takano et al. | |
| 2014/0199583 | A1 | 7/2014 | Toshiba | |
| 2016/0118667 | A1 | 4/2016 | Blizanac et al. | |
| 2016/0372740 | A1* | 12/2016 | Kajiyama | H01M 4/505 |
| 2017/0324096 | A1* | 11/2017 | Korchev | C09C 1/56 |
| 2019/0177551 | A1 | 6/2019 | Nagai et al. | |
| 2020/0313159 | A1* | 10/2020 | Osumi | H01M 4/525 |
| 2021/0119206 | A1* | 4/2021 | Nagai | H01M 10/0525 |
| 2022/0013777 | A1* | 1/2022 | Nagai | H01M 4/5825 |

FOREIGN PATENT DOCUMENTS

| | | | | |
|---|---|---|---|---|
| CN | 102702801 | A | 10/2012 | |
| CN | 103003983 | A | 3/2013 | |
| CN | 105283514 | A | 1/2016 | |
| EP | 2351798 | A1 | 8/2011 | |
| EP | 2595221 | A1 | 5/2013 | |
| EP | 3506402 | A1 | 7/2019 | |
| EP | 3298082 | B1 | 9/2019 | |
| EP | 3686965 | A1 | 7/2020 | |
| EP | 3716376 | A1 | 9/2020 | |
| EP | 3767709 | A1 | 1/2021 | |
| JP | H09-241527 | A | 9/1997 | |
| JP | 2001-126733 | A | 5/2001 | |
| JP | 2006-052237 | A | 2/2006 | |
| JP | 2006-210007 | A | 8/2006 | |
| JP | 2006-213767 | A | 8/2006 | |
| JP | 2007-204531 | A | 8/2007 | |
| JP | 2008-227481 | A | 9/2008 | |
| JP | 2010-238575 | A | 10/2010 | |
| JP | 2012-038724 | A | 2/2012 | |
| JP | 2014-193986 | A | 10/2014 | |
| JP | 2014-214290 | A | 11/2014 | |
| JP | 2014-221889 | A | 11/2014 | |
| JP | 2016-025077 | A | 2/2016 | |
| JP | 2017-182962 | A | 10/2017 | |
| JP | 2018-522977 | A | 8/2018 | |
| JP | 2020-170723 | A | 10/2020 | |
| KR | 1020160010399 | A | 1/2016 | |
| KR | 10-2019-0080698 | A | 7/2019 | |
| WO | WO 2010/035871 | A1 | 4/2010 | |
| WO | WO 2014/185452 | A1 | 11/2014 | |
| WO | WO 2015/129683 | A1 | 9/2015 | |
| WO | WO 2017/005921 | A1 | 1/2017 | |
| WO | WO 2018/037910 | A1 | 3/2018 | |
| WO | WO-2019073830 | A1 * | 4/2019 | H01M 4/131 |
| WO | WO-2019216275 | A1 * | 11/2019 | H01M 10/0525 |
| WO | WO-2020111201 | A1 * | 6/2020 | H01M 10/0525 |

OTHER PUBLICATIONS

Japan Patent Office, International Search Report issued in International Application No. PCT/JP2022/023821 (Aug. 16, 2022).

European Patent Office, Extended European Search Report issued in European Patent Application No. 22828278.6 (Oct. 7, 2024).

The International Bureau of WIPO, International Preliminary Report on Patentability issued in International Application No. PCT/JP2021/044301 (Jun. 15, 2023).

European Patent Office, Notice of Opposition issued in Application No. 21900670.7 (May 12, 2026).

Bourrat, Xavier, "Electrically conductive grades of carbon black: structure and properties", Carbon, vol. 31, No. 2, pp. 287-302 (1993).

European Patent Office, Office Action issued in Application No. 21900670.7 (Jun. 1, 2026).

* cited by examiner

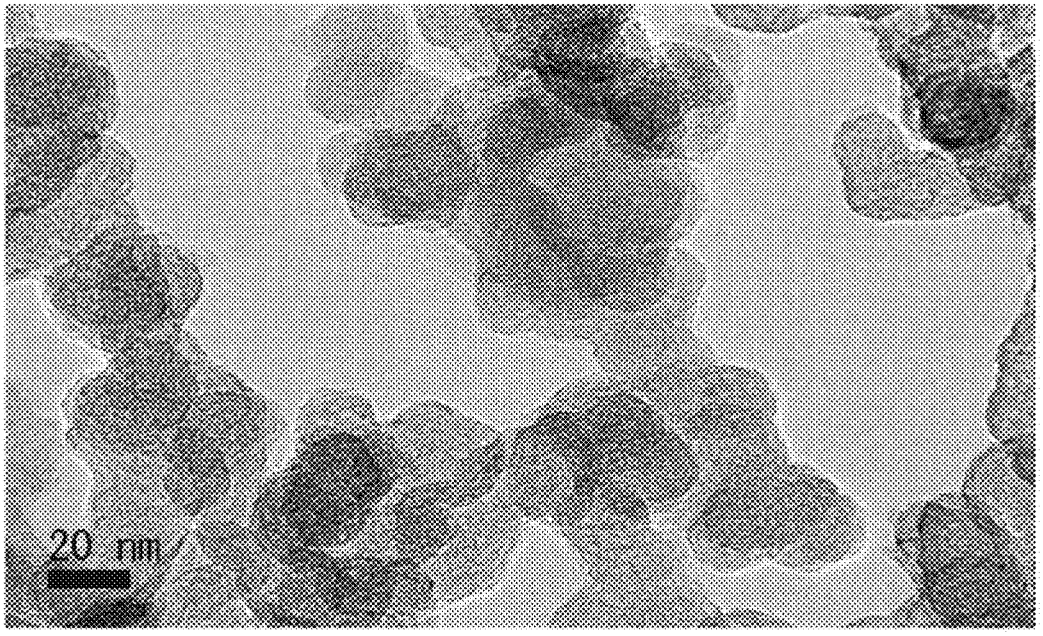
20 nm

POSITIVE ELECTRODE COMPOSITION, POSITIVE ELECTRODE, AND BATTERY

TECHNICAL FIELD

The present invention relates to a positive electrode composition, a positive electrode, and a battery.

BACKGROUND ART

A surge of environmental and energy issues leads to vigorous development of technologies for realizing a low-carbon society that reduces dependency on fossil fuels. Such technological developments include many different fields, including development of low-emission vehicles such as hybrid electric vehicles and electric vehicles, development of natural energy power generation and storage systems such as solar power generation and wind power generation, development of next-generation electricity transmission network that efficiently supplies electric power and reduces power transmission loss, and the like.

One of key devices commonly required for those technologies is a battery, and such a battery requires a high energy density for downsizing the system. Furthermore, there is a need for high output characteristics that enable stable supply of electric power regardless of operating ambient temperatures. Further, there is also a need for favorable cycle characteristics and the like that can withstand long-term use. Therefore, conventional lead storage batteries, nickel-cadmium batteries, and nickel-hydrogen batteries have been rapidly replaced with lithium ion secondary batteries having higher energy density, output characteristics, and cycle characteristics.

Conventionally, a positive electrode of a lithium ion secondary battery is produced by applying a positive electrode paste containing a positive electrode active material, an electrical conducting material, and a binding material (also called a binder) to a current collector. As the positive electrode active material, lithium-containing composite oxides such as lithium cobalt oxide and lithium manganese oxide have been used. Since the positive electrode active material has poor electrical conductivity, an electrical conducting material such as carbon black has been added to the positive electrode paste for the purpose of imparting electrical conductivity (Patent Literature 1).

Incidentally, in recent years, there is a need for further improvements in the energy density of lithium ion secondary batteries. In order to improve the energy density, studies are being conducted to reduce the content of the electrical conducting material, which is a component not contributing to charge/discharge capacity, in the positive electrode, and to increase the content of the positive electrode active material. As a means for maintaining electrical conductivity while reducing the content of the electrical conducting material, it has been proposed to use a particulate electrical conducting material such as carbon black in combination with a fibrous electrical conducting material having a higher aspect ratio than the particulate electrical conducting material.

For example, Patent Literature 2 also discloses that an electrical conductive additive is used which includes a three-dimensional network structure of at least two carbonaceous materials selected from the group consisting of carbon nanotubes CNT (A) of a first diameter, carbon nanotubes CNT (B) of a second diameter, graphene, and carbon black. Furthermore, Patent Literature 3 discloses that, by using, as an electrical conducting material, a material containing a mixture of carbon black having an average particle diameter of 1 nm to 100 nm, a dibutyl phthalate oil absorption number of 50 ml/100 g or more, and an iodine adsorption number of 2000 mg/g or less, and graphitized carbon fibers having an average fiber diameter of 0.01 μm to 10 μm, an average fiber length of 1 μm to 200 μm, a true density of 1.8 g/cm$^3$ or more, and an X-ray diffraction parameter d(002) of 0.345 nm or less, a conductive path in a positive electrode is stabilized to thereby reduce initial internal resistance, and a non-aqueous electrolyte battery with excellent quick charging/discharging of a large current and long-term reliability is provided. Furthermore, Patent Literature 4 discloses that an electrode for a lithium-ion battery containing, as an electrical conducting material, (a) a fine fibrous carbon having a diameter of less than 100 nm, and (b) a fibrous carbon having a diameter of 100 nm or more and/or (c) a non-fibrous conductive carbon provides an electrode for a lithium-ion battery with a small electrode surface resistance, excellent discharge capacity, and excellent cycle characteristics.

CITATION LIST

Patent Literature

Patent Literature 1: Japanese Unexamined Patent Publication No. 2008-227481

Patent Literature 2: Japanese Unexamined Patent Publication No. 2016-25077

Patent Literature 3: Japanese Unexamined Patent Publication No. 2001-126733

Patent Literature 4: Japanese Unexamined Patent Publication No. 2010-238575

SUMMARY OF INVENTION

Technical Problem

However, with the combination of the carbon black and the carbon nanotubes described in Patent Literatures 2 to 4, sufficiently excellent battery characteristics cannot be obtained.

The present invention has been made in view of the above problems and actual circumstances, and an object thereof is to provide a positive electrode composition with which a lithium ion secondary battery having low internal resistance and excellent discharge rate characteristics and cycle characteristics can be obtained. Furthermore, another object of the present invention is to provide a positive electrode containing the above-described positive electrode composition. Furthermore, still another object of the present invention is to provide a battery including the above-described positive electrode.

Solution to Problem

The present invention relates to, for example, the following <1> to <8>.

<1> A positive electrode composition containing carbon black, carbon nanotubes, an active material, and a binding material, in which the carbon black has a BET specific surface area of 100 to 400 m$^2$/g and a crystallite size (Lc) of 15 to 26 Å, the carbon nanotubes have an average diameter of 5 to 15 nm, and a ratio (average diameter/BET specific surface area) of the average diameter with respect to a BET specific surface area of the carbon nanotubes is 0.01 to 0.068 nm/(m$^2$/g). Note that, in the present specification, in a case where the tilde symbol "~ (to)" is used to describe, for example, "x~y (x to y)" (x and y are numerical values), this case means "x or more and y or less." Specifically, "BET specific surface area of 100 to 400 $m^2$/g" means "BET specific surface area of 100 $m^2$/g or more and 400 $m^2$/g or less".

<2> The positive electrode composition described in <1>, in which an average primary particle size of the carbon black is 17 to 30 nm.

<3> The positive electrode composition described in <1> or <2>, in which a ratio ($S_2/S_1$) of a peak area ($S_2$) of a peak with mass number m/z128 with respect to a peak area ($S_1$) of a peak with mass number m/z57 as detected by a temperature-programmed desorption gas analysis method of the carbon black is 0.2 to 1.9.

<4> The positive electrode composition described in any one of <1> to <3>, in which the crystallite size (Lc) of the carbon black is 15 to 20 Å.

<5> The positive electrode composition described in any one of <1> to <4>, in which the BET specific surface area of the carbon black is 170 to 400 $m^2$/g.

<6> The positive electrode composition described in any one of <1> to <5>, in which the average diameter of the carbon nanotubes is 5 to 10 nm.

<7> The positive electrode composition described in any one of <1> to <6>, in which a content of the carbon black is 40 to 90% by mass on the basis of the total content of the carbon black and the carbon nanotubes.

<8> A positive electrode containing the positive electrode composition described in any one of <1> to <7>.

<9> A battery including the positive electrode described in <8>.

Advantageous Effects of Invention

According to the present invention, it is possible to provide a positive electrode composition with which a lithium ion secondary battery having low internal resistance and excellent discharge rate characteristics and cycle characteristics can be obtained. Furthermore, according to the present invention, it is possible to provide a positive electrode containing the above-described positive electrode composition. Furthermore, according to the present invention, it is possible to provide a battery including the above-described positive electrode.

BRIEF DESCRIPTION OF DRAWINGS

FIG. 1 is a view showing an example of carbon black used in Examples.

DESCRIPTION OF EMBODIMENTS

Hereinafter, an embodiment of the present invention will be specifically described. A positive electrode composition of the present embodiment contains carbon black, carbon nanotubes, an active material, and a binding material. In the positive electrode composition of the present embodiment, the carbon black has a BET specific surface area of 100 to 400 $m^2$/g and a crystallite size (Lc) of 15 to 26 Å, and the carbon nanotubes have an average diameter of 5 to 15 nm. Furthermore, a ratio (average diameter/BET specific surface area) of the average diameter with respect to a BET specific surface area of the carbon nanotubes is 0.01 to 0.068 nm/($m^2$/g).

The positive electrode composition of the present embodiment contains carbon black having a specific BET specific surface area and a specific crystallite size (Lc), carbon nanotubes having a specific average diameter and a specific ratio (average diameter/BET specific surface area), as an electrical conducting material.

The basic role of the electrical conducting material is to impart electrical conductivity to a positive electrode active material having poor electrical conductivity. Furthermore, in a lithium ion secondary battery, as positive electrode active materials expand and contract through repeated charging and discharging, the contact points between the positive electrode active materials are gradually lost, but the electrical conducting material also has a role of connecting the positive electrode active materials whose contact points have been lost and preventing electrical conductivity from being impaired. In a case where the dispersibility of the electrical conducting material with respect to the positive electrode active material is poor, the positive electrode active material and the electrical conducting material cannot come into sufficient contact with each other, and a conductive path is difficult to be formed, so that a problem arises in that the performance of the active material cannot be sufficiently brought out. As a result, areas with poor electrical conductivity appear locally in the positive electrode, and thus it is considered that the active material is not sufficiently utilized, resulting in a decrease in discharge capacity and a shortened battery life. Furthermore, it is considered to increase the content of the electrical conducting material in order to secure a conductive path, but from the viewpoint of improving battery characteristics, it is desirable to decrease the content of the electrical conducting material that does not contribute to charge/discharge capacity in the positive electrode and to increase the content of the positive electrode active material.

In the present embodiment, with the combination of specific carbon black and specific carbon nanotubes, the electrical conducting material is likely to be uniformly dispersed in the positive electrode composition. Furthermore, with the above combination, since the electrical conducting material can efficiently form a conductive path in the positive electrode composition, in the present embodiment, excellent battery characteristics can be maintained even when the content of the electrical conducting material is reduced.

The carbon black may be carbon black used as a general electrical conducting material for batteries, and may be acetylene black, furnace black, channel black, and the like. The carbon black is preferably acetylene black from the viewpoint of excellent purity and ease of obtaining excellent battery characteristics.

The BET specific surface area of the carbon black is 100 to 400 $m^2$/g. When the BET specific surface area of the carbon black is 100 $m^2$/g or more, there are more electrical contact points with the active material and the electrical conducting material, and the effect of imparting electrical conductivity becomes favorable, so that excellent battery characteristics are obtained. Furthermore, when the BET specific surface area of the carbon black is 400 $m^2$/g or less, the interaction between the solvent and the electrical conducting material and between the electrical conducting materials are reduced, so that the carbon black is likely to be uniformly dispersed with respect to the active material, so that a conductive path is easily formed to obtain excellent battery characteristics. The BET specific surface area of the carbon black can be measured by a static capacity method according to JIS Z 8830 using nitrogen as an adsorbate.

From the viewpoint of further reducing the internal resistance and the viewpoint of more excellent discharge rate characteristics and cycle characteristics, the BET specific surface area of the carbon black is preferably 130 $m^2/g$ or more and more preferably 150 $m^2/g$ or more, and may be 170 $m^2/g$ or more, 200 $m^2/g$ or more, 220 $m^2/g$ or more, or 240 $m^2/g$ or more. From the viewpoint of further reducing the internal resistance and the viewpoint of more excellent discharge rate characteristics and cycle characteristics, the BET specific surface area of the carbon black is 400 $m^2/g$ or less and preferably 370 $m^2/g$ or less, and may be 350 $m^2/g$ or less, 330 $m^2/g$ or less, 300 $m^2/g$ or more, 280 $m^2/g$ or more, or 260 $m^2/g$ or less. From these viewpoints, the BET specific surface area of the carbon black may be, for example, 100 to 400 $m^2/g$, 100 to 370 $m^2/g$, 100 to 350 $m^2/g$, 100 to 330 $m^2/g$, 100 to 300 $m^2/g$, 100 to 280 $m^2/g$, 100 to 260 $m^2/g$, 130 to 400 $m^2/g$, 130 to 370 $m^2/g$, 130 to 350 $m^2/g$, 130 to 330 $m^2/g$, 130 to 300 $m^2/g$, 130 to 280 $m^2/g$, 130 to 260 $m^2/g$, 150 to 400 $m^2/g$, 150 to 370 $m^2/g$, 150 to 350 $m^2/g$, 150 to 330 $m^2/g$, 150 to 300 $m^2/g$, 150 to 280 $m^2/g$, 150 to 260 $m^2/g$, 170 to 400 $m^2/g$, 170 to 370 $m^2/g$, 170 to 350 $m^2/g$, 170 to 330 $m^2/g$, 170 to 300 $m^2/g$, 170 to 280 $m^2/g$, 170 to 260 $m^2/g$, 200 to 400 $m^2/g$, 200 to 370 $m^2/g$, 200 to 350 $m^2/g$, 200 to 330 $m^2/g$, 200 to 300 $m^2/g$, 200 to 280 $m^2/g$, 200 to 260 $m^2/g$, 220 to 400 $m^2/g$, 220 to 370 $m^2/g$, 220 to 350 $m^2/g$, 220 to 330 $m^2/g$, 220 to 300 $m^2/g$, 220 to 280 $m^2/g$, 220 to 260 $m^2/g$, 240 to 400 $m^2/g$, 240 to 370 $m^2/g$, 240 to 350 $m^2/g$, 240 to 330 $m^2/g$, 240 to 300 $m^2/g$, 240 to 280 $m^2/g$, or 240 to 260 $m^2/g$.

The crystallite size (Lc) of the carbon black is 15 to 26 Å. When the crystallite size (Lc) is 15 Å or more, it becomes easier for electrons to move through the crystal layer, and a conductive path that carries electrons flowing from the current collector to the active material is easily formed, so that excellent battery characteristics are obtained. Furthermore, when the crystallite size (Lc) is 15 Å or more, oxidative decomposition hardly occurs even in the case of using the carbon black under high voltage. When the crystallite size (Lc) is 26 Å or less, since the particle shape of the carbon black becomes more rounded, the interparticle interaction is reduced, and the carbon black is likely to be uniformly dispersed with respect to the active material, so that a conductive path is easily formed to obtain excellent battery characteristics. The crystallite size (Lc) of the carbon black can be measured according to JIS R 7651. Note that, the crystallite size (Lc) of the carbon black means the crystallite size in the c-axis direction of the carbon black crystal layer.

From the viewpoint of further reducing the internal resistance and the viewpoint of more excellent discharge rate characteristics and cycle characteristics, the crystallite size (Lc) of the carbon black may be 24 Å or less or 22 Å or less, is preferably 20 Å or less, and may be 18 Å or less. Furthermore, the crystallite size (Lc) of the carbon black may be 16 Å or more, 18 Å or more, or 20 Å or more. From these viewpoints, the crystallite size (Lc) of the carbon black may be, for example, 15 to 26 Å, 15 to 24 Å, 15 to 22 Å, 15 to 20 Å, 15 to 18 Å, 16 to 26 Å, 16 to 24 Å, 16 to 22 Å, 16 to 20 Å, 16 to 18 Å, 18 to 26 Å, 18 to 24 Å, 18 to 22 Å, 18 to 20 Å, 20 to 26 Å, 20 to 24 Å, or 20 to 22 Å.

The average primary particle size of the carbon black may be 17 to 30 nm. When the average primary particle size of the carbon black is 17 nm or more, the interaction between the solvent and the electrical conducting material and between the electrical conducting materials are reduced, and the carbon black is likely to be uniformly dispersed with respect to the active material, so that a conductive path is easily formed to more easily obtain excellent battery characteristics. When the average primary particle size of the carbon black is 30 nm or less, there are more electrical contact points with the active material and the electrical conducting material, and the effect of imparting electrical conductivity becomes favorable, so that excellent battery characteristics are more easily obtained. The average primary particle size of the carbon black means an averaged value of equivalent circle diameters measured based on images of the carbon black observed with a transmission electron microscope (TEM), and specifically, is obtained by capturing ten images of the carbon black at a magnification of 100000 times using a transmission electron microscope JEM-2000FX (manufactured by JEOL Ltd.), and measuring the equivalent circle diameters of 200 primary particles of the carbon black randomly extracted from the obtained images by image analysis to obtain an arithmetic average.

From the viewpoint of further reducing the internal resistance and the viewpoint of more excellent discharge rate characteristics and cycle characteristics, the average primary particle size of the carbon black may be 26 nm or less, 24 nm or less, 22 nm or less, or 20 nm or less. Furthermore, the average primary particle size of the carbon black may be 18 nm or more or 20 nm or more. From these viewpoints, the average primary particle size of the carbon black may be, for example, 17 to 30 nm, 17 to 26 nm, 17 to 24 nm, 17 to 22 nm, 17 to 20 nm, 18 to 30 nm, 18 to 26 nm, 18 to 24 nm, 18 to 22 nm, or 18 to 20 nm.

When a peak area of a peak with mass number m/z57 and a peak area of a peak with mass number m/z128 as detected by a temperature-programmed desorption gas analysis method of the carbon black are designated as $S_1$ and $S_2$, respectively, a ratio ($S_2/S_1$) of the peak area $S_2$ with respect to the peak area $S_1$ is preferably 0.2 to 1.9. The ratio ($S_2/S_1$) indicates the proportion of organic components adsorbed on the surface of the carbon black. When the ratio ($S_2/S_1$) is 1.9 or less, the organic components adsorbed on the surface of the carbon black are sufficiently reduced, and a decrease in electrical conductivity caused by the organic components trapping π electrons is significantly suppressed. Furthermore, when the ratio ($S_2/S_1$) is 0.2 or more, the organic components adsorbed on the surface of the carbon black play the role of a dispersant, and dispersibility in the solvent is improved, so that the slurry viscosity is further reduced. The peak area $S_1$ of the peak with mass number m/z57 and the peak area $S_2$ of the peak with mass number m/z128 can be measured by evolved gas analysis-mass spectrometry (EGA-MS). For example, the peak area $S_1$ of the peak with mass number m/z57 and the peak area $S_2$ of the peak with mass number m/z128 can be measured by setting the carbon black in a gas chromatograph mass spectrometer having a thermal cracking device, increasing the temperature to 800° C. at 80° C./min after maintaining the carbon black at 50° C. for 5 minutes in an atmospheric pressure He flow, and performing the mass spectrometry of the component desorbed by the temperature increase. More specifically, the peak areas can be measured by the method described in Examples below.

From the viewpoint of further reducing the internal resistance and the viewpoint of more excellent discharge rate characteristics and cycle characteristics, the ratio ($S_2/S_1$) may be 1.5 or less, 1.0 or less, 0.8 or less, 0.6 or less, 0.5 or less, 0.4 or less, or 0.3 or less. Furthermore, the ratio ($S_2/S_1$) may be 0.25 or more or 0.3 or more. From these viewpoints, the ratio ($S_2/S_1$) may be, for example, 0.2 to 1.9, 0.2 to 1.5, 0.2 to 1.0, 0.2 to 0.8, 0.2 to 0.6, 0.2 to 0.5, 0.2 to 0.4, 0.2 to 0.3, 0.25 to 1.9, 0.25 to 1.5, 0.25 to 1.0, 0.25 to 0.8, 0.25 to 0.6, 0.25 to 0.5, 0.25 to 0.4, 0.25 to 0.3, 0.3 to 1.9, 0.3 to 1.5, 0.3 to 1.0, 0.3 to 0.8, 0.3 to 0.6, 0.3 to 0.5, or 0.3 to 0.4.

The volume resistivity of the carbon black may be 0.30 Ω·cm or less or 0.25 Ω·cm or less, from the viewpoint of excellent electrical conductivity. The volume resistivity of the carbon black is measured, for example, in a compressed state under a load of 7.5 MPa.

The ash content and the moisture content of the carbon black are not particularly limited. The ash content of the carbon black may be, for example, 0.04% by mass or less, and the moisture content of the carbon black may be, for example, 0.10% by mass or less.

The content of the carbon black may be 0.01% by mass or more, 0.1% by mass or more, 0.3% by mass or more, 0.5% by mass or more, or 0.7% by mass or more, on the basis of the total mass of the solid contents in the positive electrode composition, from the viewpoint of further reducing the internal resistance and the viewpoint of more excellent discharge rate characteristics and cycle characteristics. The content of the carbon black may be 5% by mass or less, 3% by mass or less, 1% by mass or less, 0.9% by mass or less, or 0.7% by mass or less, on the basis of the total mass of the solid contents in the positive electrode composition. From these viewpoints, the content of the carbon black may be, for example, 0.01 to 5% by mass, 0.01 to 3% by mass, 0.01 to 1% by mass, 0.01 to 0.9% by mass, 0.01 to 0.7% by mass, 0.1 to 5% by mass, 0.1 to 3% by mass, 0.1 to 1% by mass, 0.1 to 0.9% by mass, 0.1 to 0.7% by mass, 0.3 to 5% by mass, 0.3 to 3% by mass, 0.3 to 1% by mass, 0.3 to 0.9% by mass, 0.3 to 0.7% by mass, 0.5 to 5% by mass, 0.5 to 3% by mass, 0.5 to 1% by mass, 0.5 to 0.9% by mass, 0.5 to 0.7% by mass, 0.7 to 5% by mass, 0.7 to 3% by mass, 0.7 to 1% by mass, or 0.7 to 0.9% by mass, on the basis of the total mass of the solid contents in the positive electrode composition.

From the viewpoint of further reducing the internal resistance and the viewpoint of more excellent discharge rate characteristics and cycle characteristics, the content of the carbon black may be 10% by mass or more, 40% by mass or more, or 60% by mass or more and may be 95% by mass or less, 90% by mass or less, or 80% by mass or less, on the basis of the total content of the carbon black and the carbon nanotubes. From the viewpoint of further reducing the internal resistance and the viewpoint of more excellent discharge rate characteristics and cycle characteristics, the content of the carbon black is preferably 40 to 90% by mass on the basis of the total content of the carbon black and the carbon nanotubes. When the content of the carbon black is 40 to 90% by mass, the carbon black easily forms a conductive path between the active materials in the positive electrode composition, and a non-aqueous electrolytic solution is likely to be maintained near the active material. Furthermore, since the carbon nanotubes easily form a conductive path on the surface of the active material to form the electrode structure, a battery having a favorable conductive path and ionic conductivity is easily obtained, and a battery having excellent battery characteristics is easily obtained. From these viewpoints, the content of the carbon black may be, for example, 10 to 95% by mass, 10 to 90% by mass, 10 to 80% by mass, 40 to 95% by mass, 40 to 90% by mass, 40 to 80% by mass, 60 to 95% by mass, 60 to 90% by mass, or 60 to 80% by mass, on the basis of the total content of the carbon black and the carbon nanotubes.

The above-described carbon black can be produced, for example, by a production method including a synthesis step of treating a raw material gas containing a hydrocarbon in a cylindrical cracking furnace to obtain carbon black, and a high purification step of removing a magnetic foreign matter from the carbon black obtained in the synthesis step with a magnet.

In the synthesis step, a raw material gas is treated in a cylindrical cracking furnace. The cylindrical cracking furnace may include, for example, a thermal cracking portion where a thermal cracking reaction of the hydrocarbon is performed, and an aging portion where a thermal cracking reaction product is reformed. The cylindrical cracking furnace may further include a supply port through which the raw material gas is supplied to the thermal cracking portion, and a recovery port through which carbon black generated in the aging portion is recovered.

In the thermal cracking portion, the supplied raw material gas is preferably retained at a temperature of 1900° C. or higher for 30 to 150 seconds. When the retention time of the raw material gas is 30 seconds or longer, it is possible to more reliably form carbon aerosols by the completion of the thermal cracking reaction and development of a chain structure. Furthermore, when the retention time of the raw material gas is 150 seconds or shorter, the aggregation of carbon aerosols is suppressed, so that the magnetic foreign matter is more easily removed in the high purification step and it becomes easy to obtain high-purity carbon black.

In the aging portion, the thermal cracking reaction product supplied from the thermal cracking portion is preferably retained at a temperature of 1700° C. or higher for 20 to 90 seconds. When the retention time of the thermal cracking reaction product is 20 seconds or longer, it becomes easy to obtain carbon black with a higher quality by the reforming of the carbon aerosols and the development of aggregates. Furthermore, when the retention time of the thermal cracking reaction product is 90 seconds or shorter, the aggregation of carbon aerosols is suppressed, so that the magnetic foreign matter is more easily removed in the high purification step and it becomes easy to obtain high-purity carbon black.

The retention time in each of the thermal cracking portion and the aging portion can be appropriately adjusted by adjusting the gas linear velocity of a circulating gas. The retention time in the aging portion is preferably shorter than the retention time in the thermal cracking portion. That is, the gas linear velocity in the aging portion is preferably faster than the gas linear velocity in the thermal cracking portion.

In the present embodiment, the raw material gas preferably contains acetylene as a carbon source. The content of the carbon source (for example, acetylene) in the raw material gas is, for example, 10% by volume or more, preferably 20% by volume or more, and more preferably 30% by volume or more, and may be 100% by volume. Note that, the content of each component in the raw material gas indicates a volume ratio based on the volume at 100° C. and 1 atm.

The raw material gas may further contain hydrocarbons other than the carbon source (for example, acetylene). Examples of the other hydrocarbons include methane, ethane, propane, ethylene, propylene, butadiene, benzene, toluene, xylene, gasoline, kerosene, light oil, and heavy oil. By adding these other hydrocarbons, the reaction temperature is changed, so that the specific surface area of the carbon black can be increased or decreased. The other hydrocarbons are preferably selected from the group consisting of aromatic hydrocarbons such as benzene and toluene and unsaturated hydrocarbons such as ethylene and propylene.

In a case where the raw material gas contains acetylene and other hydrocarbons, the content of the other hydrocarbons is, for example, 0.1 to 99 parts by volume, preferably 0.2 to 50 parts by volume, and more preferably 0.3 to 30 parts by volume, with respect to 100 parts by volume of acetylene. That is, the content of the other hydrocarbons may be, for example, 0.1 to 99 parts by volume, 0.1 to 50 parts by volume, 0.1 to 30 parts by volume, 0.2 to 99 parts by volume, 0.2 to 50 parts by volume, 0.2 to 30 parts by volume, 0.3 to 99 parts by volume, 0.3 to 50 parts by volume, or 0.3 to 30 parts by volume, with respect to 100 parts by volume of acetylene.

The raw material gas may further contain water vapor gas, oxygen gas, hydrogen gas, carbon dioxide gas, and the like. As these gases, 99.9% by volume or more of high-purity gases are preferably used. When such high-purity gases are used, there is a tendency that it becomes easy to produce carbon black in which the amount of the magnetic foreign matter is small and the BET specific surface area and the oil absorption number are stable.

The content of the water vapor gas may be, for example, 0 to 80 parts by volume with respect to 100 parts by volume of the carbon source (for example, acetylene) in the raw material gas, and is preferably 0.1 to 70 parts by volume, more preferably 1 to 60 parts by volume, and further preferably 3 to 55 parts by volume. When the content of the water vapor gas is in the above range, the BET specific surface area of the carbon black tends to become larger. That is, the content of the water vapor gas may be, for example, 0 to 80 parts by volume, 0 to 70 parts by volume, 0 to 60 parts by volume, 0 to 55 parts by volume, 0.1 to 80 parts by volume, 0.1 to 70 parts by volume, 0.1 to 60 parts by volume, 0.1 to 55 parts by volume, 1 to 80 parts by volume, 1 to 70 parts by volume, 1 to 60 parts by volume, 1 to 55 parts by volume, 3 to 80 parts by volume, 3 to 70 parts by volume, 3 to 60 parts by volume, or 3 to 55 parts by volume, with respect to 100 parts by volume of the carbon source (for example, acetylene) in the raw material gas.

In the synthesis step, it is preferable to supply the oxygen gas together with the raw material gas to the thermal cracking portion, and it is more preferable to supply the oxygen gas to the thermal cracking portion by spraying the oxygen gas from the circumference of the supply port through which the raw material gas is supplied to the thermal cracking portion.

The cylindrical cracking furnace preferably has a spray port for the oxygen gas near the supply port of the raw material gas and more preferably has a plurality of spray ports provided at equal intervals so as to surround the supply port. The number of spray ports is preferably 3 or more and more preferably 3 to 8.

Furthermore, the cylindrical cracking furnace may also include a nozzle with a multi-tube structure (for example, a double tube structure, a triple tube structure, or the like) having the spray port of the raw material gas and the spray port for spraying the oxygen gas from the circumference of the supply port. In the case of a double tube structure, for example, the raw material gas may be sprayed from an air gap portion on the inner cylinder side, and the oxygen gas may be sprayed from an air gap portion on the outer cylinder side. In the case of a triple tube structure composed of an inner tube, a middle tube, and an outer tube, for example, the oxygen gas may be sprayed from an air gap portion formed by the outer wall of the middle tube and the inner wall of the outer tube, and the raw material gas may be sprayed from the remaining air gap portion.

The amount of the oxygen gas sprayed is not particularly limited as long as the production yield of carbon black is not taken into account. Carbon black can be produced even when a large amount of the oxygen gas than necessary is sprayed. The amount of the oxygen gas sprayed may be, for example, 0 to 300 parts by volume, 0 to 250 parts by volume, 0 to 220 parts by volume, or 0 to 200 parts by volume, and is preferably 0.1 to 190 parts by volume, more preferably 0.5 to 180 parts by volume, and further preferably 1 to 160 parts by volume, with respect to 100 parts by volume of the carbon source (for example, acetylene) in the raw material gas. When the amount of the oxygen gas sprayed increases, there is a tendency that the BET specific surface area of the carbon black and the above-described ratio ($S_2/S_1$) further increase, and when the amount of the oxygen gas sprayed decreases, there is a tendency that the primary particle size of the carbon black increases. That is, the amount of the oxygen gas sprayed may be, for example, 0 to 300 parts by volume, 0 to 250 parts by volume, 0 to 220 parts by volume, 0 to 200 parts by volume, 0 to 190 parts by volume, 0 to 180 parts by volume, 0 to 160 parts by volume, 0.1 to 300 parts by volume, 0.1 to 250 parts by volume, 0.1 to 220 parts by volume, 0.1 to 200 parts by volume, 0.1 to 190 parts by volume, 0.1 to 180 parts by volume, 0.1 to 160 parts by volume, 0.5 to 300 parts by volume, 0.5 to 250 parts by volume, 0.5 to 220 parts by volume, 0.5 to 200 parts by volume, 0.5 to 190 parts by volume, 0.5 to 180 parts by volume, 0.5 to 160 parts by volume, 1 to 300 parts by volume, 1 to 250 parts by volume, 1 to 220 parts by volume, 1 to 200 parts by volume, 1 to 190 parts by volume, 1 to 180 parts by volume, or 1 to 160 parts by volume, with respect to 100 parts by volume of the carbon source (for example, acetylene) in the raw material gas.

In the synthesis step, the primary particle size, the BET specific surface area, and the crystallite size (Lc) of carbon black to be obtained can be adjusted, for example, by adjusting the addition rate of the hydrocarbons other than acetylene, the amount of the oxygen gas to be sprayed, or the like.

The high purification step is a step of removing a magnetic foreign matter from the carbon black obtained in the synthesis step with a magnet. The high purification step may be, for example, a step of removing a magnetic foreign matter from the carbon black obtained in the synthesis step by bringing the carbon black into contact with the magnet or disposing the carbon black near the magnet (for example, passing the carbon black through near the magnet).

The maximum surface magnetic flux density of the magnet is not particularly limited, but may be, for example, 700 mT or more, and is preferably 1000 mT or more and more preferably 1200 mT or more. Thereby, a fine magnetic foreign matter adhering to the carbon black is more strongly adsorbed, and thus it becomes easy to obtain carbon black having a smaller nickel content. The upper limit of the maximum surface magnetic flux density of the magnet is not particularly limited, and may be, for example, 1400 mT or less. That is, the maximum surface magnetic flux density of the magnet may be, for example, 700 to 1400 mT, 1000 to 1400 mT, or 1200 to 1400 mT.

The high purification step may be a step of removing a magnetic foreign matter from the carbon black so that the nickel content is 50 ppb or less (preferably 40 ppb or less, more preferably 30 ppb or less, and further preferably 20 ppb or less). The lower limit of the nickel content is not particularly limited, but the nickel content in the carbon black may be, for example, 1 ppb or more, and from the viewpoint of cost and productivity, may be 10 ppb or more or 15 ppb or more. That is, the nickel content in the carbon black may be, for example, 1 to 50 ppb, 1 to 40 ppb, 1 to 30 ppb, 1 to 20 ppb, 10 to 50 ppb, 10 to 40 ppb, 10 to 30 ppb, 10 to 20 ppb, 15 to 50 ppb, 15 to 40 ppb, 15 to 30 ppb, or 15 to 20 ppb.

The positive electrode composition of the present embodiment contains carbon nanotubes as an electrical conducting material. The carbon nanotubes have an average diameter of 5 to 15 nm, and a ratio (average diameter/BET specific surface area) of the average diameter with respect to the BET specific surface area of the carbon black is 0.01 to 0.068 nm/($m^2$/g). In the present embodiment, when the average diameter of the carbon nanotubes is as small as 5 to 15 nm and the ratio of the average diameter with respect to the BET specific surface area of the carbon nanotubes is set to 0.01 to 0.068 nm/($m^2$/g), many conductive paths can be formed in the positive electrode.

The average diameter of the carbon nanotubes is 5 to 15 nm. When the average diameter of the carbon black is 5 nm or more, the interaction between the solvent and the electrical conducting material and between the electrical conducting materials are reduced, and the carbon black is likely to be uniformly dispersed with respect to the active material, so that a conductive path is easily formed to more easily obtain excellent battery characteristics. When the average diameter of the carbon black is 15 nm or less, there are more electrical contact points with the active material and the electrical conducting material, and the effect of imparting electrical conductivity becomes favorable, so that excellent battery characteristics are more easily obtained.

From the viewpoint of further reducing the internal resistance and the viewpoint of more excellent discharge rate characteristics and cycle characteristics, the average diameter of the carbon nanotubes is preferably 12 nm or less and more preferably 10 nm or less, and may be 8 nm or less or 6 nm or less. The average diameter of the carbon nanotubes may be 6 nm or more. From these viewpoints, the average diameter of the carbon nanotubes may be, for example, 5 to 15 nm, 5 to 12 nm, 5 to 10 nm, 5 to 8 nm, 5 to 6 nm, 6 to 15 nm, 6 to 12 nm, 6 to 10 nm, or 6 to 8 nm. The average diameter of the carbon nanotubes means an average value of diameters measured based on images of the carbon nanotubes observed with a transmission electron microscope (TEM), and specifically, is obtained by capturing ten images of the carbon nanotubes at a magnification of 200000 times using a transmission electron microscope JEM-2000FX (manufactured by JEOL Ltd.), and measuring the diameters of 100 carbon nanotubes randomly extracted from the obtained images by image analysis to obtain an arithmetic average.

The BET specific surface area of the carbon nanotubes is preferably 170 to 320 $m^2$/g. When the BET specific surface area of the carbon nanotubes is 170 $m^2$/g or more, there are more electrical contact points with the active material and the electrical conducting material, and the effect of imparting electrical conductivity becomes favorable, so that excellent battery characteristics are more easily obtained. When the BET specific surface area of the carbon nanotubes is 320 $m^2$/g or less, the interaction between the solvent and the electrical conducting material and between the electrical conducting materials are reduced, so that the carbon nanotubes are likely to be uniformly dispersed with respect to the active material, so that a conductive path is easily formed to more easily obtain excellent battery characteristics. The BET specific surface area of the carbon nanotubes can be measured by a static capacity method according to JIS Z 8830 using nitrogen as an adsorbate.

From the viewpoint of further reducing the internal resistance and the viewpoint of more excellent discharge rate characteristics and cycle characteristics, the BET specific surface area of the carbon nanotubes may be 180 $m^2$/g or more, 200 $m^2$/g or more, 230 $m^2$/g or more, 250 $m^2$/g or more, 280 $m^2$/g or more, or 300 $m^2$/g or more. From the viewpoint of further reducing the internal resistance and the viewpoint of more excellent discharge rate characteristics and cycle characteristics, the BET specific surface area of the carbon nanotubes may be 300 $m^2$/g or less. From these viewpoints, the BET specific surface area of the carbon nanotubes may be, for example, 170 to 320 $m^2$/g, 170 to 300 $m^2$/g, 180 to 320 $m^2$/g, 180 to 300 $m^2$/g, 200 to 320 $m^2$/g, 200 to 300 $m^2$/g, 230 to 320 $m^2$/g, 230 to 300 $m^2$/g, 250 to 320 $m^2$/g, 250 to 300 $m^2$/g, 280 to 320 $m^2$/g, 280 to 300 $m^2$/g, or 300 to 320 $m^2$/g.

The ratio (average diameter/BET specific surface area) of the average diameter of the carbon nanotubes with respect to the BET specific surface area of the carbon black is 0.01 to 0.068 nm/($m^2$/g). The average diameter/the BET specific surface area is a value obtained by dividing the average diameter of the carbon nanotubes by the BET specific surface area of the carbon nanotubes. When the average diameter/the BET specific surface area is 0.01 nm/($m^2$/g) or more, entanglement between the carbon nanotubes is reduced, and the carbon nanotubes are likely to be uniformly dispersed with respect to the active material, so that a conductive path is easily formed to obtain excellent battery characteristics. When the average diameter/the BET specific surface area is 0.068 nm/($m^2$/g) or less, the number of carbon nanotubes per unit weight increases, and electricity can be allowed to flow efficiently throughout the entire active material, so that excellent battery characteristics are obtained.

From the viewpoint of further reducing the internal resistance and the viewpoint of more excellent discharge rate characteristics and cycle characteristics, the average diameter/the BET specific surface area may be 0.06 nm/($m^2$/g) or less, 0.04 nm/($m^2$/g) or less, 0.03 nm/($m^2$/g) or less, or 0.02 nm/($m^2$/g) or less. From the viewpoint of further reducing the internal resistance and the viewpoint of more excellent discharge rate characteristics and cycle characteristics, the average diameter/the BET specific surface area may be 0.02 nm/($m^2$/g) or more. From these viewpoints, the average diameter/the BET specific surface area may be, for example, 0.01 to 0.068 nm/($m^2$/g), 0.01 to 0.06 nm/($m^2$/g), 0.01 to 0.04 nm/($m^2$/g), 0.01 to 0.03 nm/($m^2$/g), 0.01 to 0.02 nm/($m^2$/g), 0.02 to 0.068 nm/($m^2$/g), 0.02 to 0.06 nm/($m^2$/g), 0.02 to 0.04 nm/($m^2$/g), or 0.02 to 0.03 nm/($m^2$/g).

The content of the carbon nanotubes may be 0.01% by mass or more, 0.05% by mass or more, 0.1% by mass or more, 0.2% by mass or more, or 0.3% by mass or more, on the basis of the total mass of the solid contents in the positive electrode composition, from the viewpoint of further reducing the internal resistance and the viewpoint of more excellent discharge rate characteristics and cycle characteristics. The content of the carbon nanotubes may be 3% by mass or less, 1% by mass or less, 0.9% by mass or less, 0.5% by mass or less, or 0.3% by mass or less, on the basis of the total mass of the solid contents in the positive electrode composition. From the above viewpoint, the content of the carbon nanotubes may be, for example, 0.01 to 3% by mass, 0.01 to 1% by mass, 0.01 to 0.9% by mass, 0.01 to 0.5% by mass, 0.01 to 0.3% by mass, 0.05 to 3% by mass, 0.05 to 1% by mass, 0.05 to 0.9% by mass, 0.05 to 0.5% by mass, 0.05 to 0.3% by mass, 0.1 to 3% by mass, 0.1 to 1% by mass, 0.1 to 0.9% by mass, 0.1 to 0.5% by mass, 0.1 to 0.3% by mass, 0.2 to 3% by mass, 0.2 to 1% by mass, 0.2 to 0.9% by mass, 0.2 to 0.5% by mass, 0.2 to 0.3% by mass, 0.3 to 3% by mass, 0.3 to 1% by mass, 0.3 to 0.9% by mass, or 0.3 to 0.5% by mass, on the basis of the total mass of the solid contents in the positive electrode composition.

From the viewpoint of further reducing the internal resistance and the viewpoint of more excellent discharge rate characteristics and cycle characteristics, the content of the carbon nanotubes may be 5% by mass or more, 10% by mass or more, or 20% by mass or more and may be 90% by mass or less, 60% by mass or less, or 40% by mass or less, on the basis of the total content of the carbon black and the carbon nanotubes. From these viewpoints, the content of the carbon nanotubes may be, for example, 5 to 90% by mass, 5 to 60% by mass, 5 to 40% by mass, 10 to 90% by mass, 10 to 60% by mass, 10 to 40% by mass, 20 to 90% by mass, 20 to 60% by mass, or 20 to 40% by mass, on the basis of the total content of the carbon black and the carbon nanotubes. In the present embodiment, when the ratio of the average diameter with respect to the BET specific surface area is set to 0.01 to 0.068 nm/($m^2$/g), even if the content of the carbon nanotubes is small (for example, even if the content of the carbon nanotubes based on the total content of the carbon black and the carbon nanotubes is 60% by mass or less), a sufficient conductive path can be formed.

The above-described carbon nanotubes can be produced by a conventionally known method for producing carbon nanotubes. The carbon nanotubes can be produced, for example, by placing a powdered catalyst in which iron is supported on magnesia (magnesium oxide) in the entire horizontal cross-sectional direction of a reactor in a vertical reactor, circulating methane in the vertical direction in the reactor, bringing the methane into contact with the catalyst at 500 to 1200° C., and then subjecting the resulting product (unoxidized carbon nanotubes) to an oxidation treatment. By the above-described method for producing carbon nanotubes, carbon nanotubes including several graphene layers and having an average diameter of 5 to 15 nm and a BET specific surface area of 160 to 300 $m^2$/g can be obtained.

The oxidation treatment of the above-described product may be, for example, a firing treatment. The temperature of the firing treatment is not particularly limited as long as carbon nanotubes contained in the positive electrode composition of the present embodiment can be obtained, and may be, for example, 300 to 1000° C.

Since the temperature of the firing treatment is affected by the atmospheric gas, it is preferable to perform the firing treatment at a relatively low temperature in the case of high oxygen concentration and at a relatively high temperature in the case of low oxygen concentration. Specifically, examples of the firing treatment of the product include a method of performing firing within a range of a combustion peak temperature of the carbon nanotubes before the oxidation treatment±50° C. in the atmosphere, but in a case where the oxygen concentration is higher than that in the atmosphere, firing is performed in a temperature range lower than a firing peak temperature, and in a case where the oxygen concentration is lower than that in the atmosphere, a temperature range higher than the firing peak temperature is selected. In particular, in the case of performing the firing treatment of the carbon nanotubes before the oxidation treatment in the atmosphere, the firing treatment is preferably performed in a range of a combustion peak temperature of the carbon nanotubes before the oxidation treatment±15° C.

The oxidation treatment of the above-described product may be a treatment with hydrogen peroxide, mixed acid, nitric acid, or the like. Examples of the method of treating the above-described product with hydrogen peroxide include a method of mixing the above-described product in 34.5% hydrogen peroxide to have a concentration of 0.01 to 10% by mass and then reacting the mixture at a temperature of 0 to 100° C. for 0.5 to 48 hours. Furthermore, examples of the method of treating the above-described product with mixed acid include a method of mixing the above-described product with a mixed solution of concentrated sulfuric acid and concentrated nitric acid (concentrated sulfuric acid: concentrated nitric acid=3:1) to have a concentration of 0.01 to 10% by mass and then reacting the mixture at a temperature of 0 to 100° C. for 0.5 to 48 hours. The mixing ratio of the mixed acid (concentrated sulfuric acid:concentrated nitric acid) can be adjusted within a range of 1:10 to 10:1 according to the amount of the single-walled carbon nanotubes in the above-described product. Examples of the method of treating the above-described product with nitric acid include a method of mixing the above-described product in nitric acid having a concentration of 40 to 80% by mass to have a concentration of 0.01 to 10% by mass and then reacting the mixture at a temperature of 60 to 150° C. for 0.5 to 48 hours.

By subjecting the above-described product to the oxidation treatment, impurities such as amorphous carbon and single-walled carbon nanotubes with low heat resistance in the product can be selectively removed, and the purity of several graphene layers, particularly, double-to five-walled carbon nanotubes can be improved. At the same time, by subjecting the product to the oxidation treatment, since a functional group is added to the surface of the carbon nanotubes, the affinity with a dispersion medium and additives is improved to improve dispersibility. Among the above-described oxidation treatments, a treatment using nitric acid is preferred.

The above-described oxidation treatment may be performed immediately after obtaining the carbon nanotubes before the oxidation treatment, and may be performed after another purification treatment. For example, in the case of using iron/magnesia as a catalyst, the oxidation treatment may be performed after the purification treatment with an acid such as hydrochloric acid is performed in order to remove the catalyst before the oxidation treatment, and the purification treatment may be performed in order to remove the catalyst after the oxidation treatment is performed.

The positive electrode composition of the present embodiment contains an active material. The active material may be any material capable of reversibly occluding and releasing cations, and may be, for example, a lithium-containing composite oxide or lithium-containing polyanion compound, which contains manganese and has a volume resistivity of $1\times10^4$ Ω·cm or more. Examples of the lithium-containing composite oxide containing manganese include lithium manganese oxides such as $LiMnO_2$, $LiMnO_3$, $LiMn_2O_3$, and $Li_{1+x}Mn_{2-x}O_4$ (provided that, x=0 to 0.33); and composite oxides containing one or more transition metal elements such as $LiMn_xNi_yCo_zO_2$ (provided that, x+y+z=1, 0≤y<1, 0≤z<1, 0≤x<1), $Li_{1+x}Mn_{2-x-y}M_yO_4$ (provided that, X=0 to 0.33, y=0 to 1.0, 2-x-y>0), $LiMn_{2-x}M_xO_2$ (provided that, x=0.01 to 0.1), and $Li_2Mn_3MO_8$. Examples of the lithium-containing polyanion compound include polyanion compounds such as $LiFePO_4$, $LiMnPO_4$, and $Li_2MPO_4F$ (provided that, M is at least one metal selected from Co, Ni, Fe, Cr, and Zn). M in each compositional formula is at least one selected from the group consisting of Fe, Co, Ni, Al, Cu, Mg, Cr, Zn, and Ta.

The average particle diameter ($D_{50}$) of the active material may be 20 μm or less or 10 μm or less, from the viewpoint that the binding property between the electrical conducting material and the binding material is sufficiently excellent and a battery with excellent cycle characteristics is easily obtained. The average particle diameter ($D_{50}$) of the active material can be measured by a laser light scattering method.

The content of the active material may be, for example, 84% by mass or more on the basis of the total mass of the solid contents in the positive electrode composition, and may be 85% by mass or more, 86% by mass or more, or 87% by mass or more, from the viewpoint of increasing the energy density of the battery. The content of the active material may be, for example, 92% by mass or less on the basis of the total mass of the solid contents in the positive electrode composition, and may be 91% by mass or less, 90% by mass or less, or 89% by mass or less, from the viewpoint of increasing the output of the battery. That is, the content of the active material may be, for example, 84 to 92% by mass, 84 to 91% by mass, 84 to 90% by mass, 84 to 89% by mass, 85 to 92% by mass, 85 to 91% by mass, 85 to 90% by mass, 85 to 89% by mass, 86 to 92% by mass, 86 to 91% by mass, 86 to 90% by mass, 86 to 89% by mass, 87 to 92% by mass, 87 to 91% by mass, 87 to 90% by mass, or 87 to 89% by mass, on the basis of the total mass of the solid contents in the positive electrode composition.

The positive electrode composition of the present embodiment contains a binding material. Examples of the binding material include polyvinylidene fluoride, polytetrafluoroethylene, a styrene-butadiene copolymer, and a (meth)acrylic acid ester copolymer. The polymer structure of the binding material may be, for example, a random copolymer, an alternating copolymer, a graft copolymer, or a block copolymer. The binding material may be polyvinylidene fluoride from the viewpoint of excellent voltage resistance.

The content of the binding material may be, for example, 1.0% by mass or more on the basis of the total mass of the solid contents in the positive electrode composition, and may be 1.5% by mass or more, 2.0% by mass or more, or 3.0% by mass or more, from the viewpoint of further enhancing the binding property of the positive electrode plate to achieve more excellent cycle characteristics. The content of the binding material may be, for example, 5.0% by mass or less on the basis of the total mass of the solid contents in the positive electrode composition, and may be 4.5% by mass or less, 4.0% by mass or less, or 3.5% by mass or less, from the viewpoint of further reducing the resistance of the positive electrode plate to achieve excellent discharge rate characteristics. That is, the content of the binding material may be, for example, 1.0 to 5.0% by mass, 1.0 to 4.5% by mass, 1.0 to 4.0% by mass, 1.0 to 3.5% by mass, 1.5 to 5.0% by mass, 1.5 to 4.5% by mass, 1.5 to 4.0% by mass, 1.5 to 3.5% by mass, 2.0 to 5.0% by mass, 2.0 to 4.5% by mass, 2.0 to 4.0% by mass, 2.0 to 3.5% by mass, 3.0 to 5.0% by mass, 3.0 to 4.5% by mass, 3.0 to 4.0% by mass, or 3.0 to 3.5% by mass, on the basis of the total mass of the solid contents in the positive electrode composition.

The positive electrode composition of the present embodiment may further contain additives other than the active material, the electrical conducting material, and the binding material. The other additives may be, for example, polyvinylpyrrolidone, polyvinylimidazole, polyethylene glycol, polyvinyl alcohol, polyvinyl butyral, carboxymethylcellulose, acetylcellulose, a carboxylic acid-modified (meth) acrylic acid ester copolymer, and the like, from the viewpoint of improving dispersibility.

The positive electrode composition of the present embodiment can be produced by a known method. For example, carbon black, carbon nanotubes, an active material, a binding material, and a dispersion medium (and other additives) are mixed using a ball mill, a sand mill, a twin-screw kneader, a rotation/revolution type stirrer, a planetary mixer, a disper mixer, or the like to obtain a positive electrode composition. The carbon black and the carbon nanotubes may be charged separately into a mixer, or may be mixed in advance.

The method for producing the positive electrode in the present embodiment is not particularly limited, but a conventionally known positive electrode production method may be used, and the positive electrode can be produced, for example, by the following method. That is, the dispersion is applied onto a metallic foil current collector such as aluminum, and then the dispersion medium contained in the mixture of the positive electrode composition of the present embodiment and the dispersion medium is removed by heating to form a film of the positive electrode composition on the surface of the current collector, thereby obtaining a positive electrode. Further, a desired positive electrode can be obtained by pressurizing the current collector and the electrode mixed material layer by roll pressing or the like to be brought into close contact with each other.

The method for producing the negative electrode in the present embodiment is not particularly limited, but a conventionally known negative electrode production method may be used, and the negative electrode can be produced, for example, by the following method. That is, a negative electrode composition containing artificial graphite or the like is applied onto a metallic foil current collector such as copper, and then the dispersion medium is removed to form a film of the negative electrode composition on the surface of the current collector, thereby obtaining a negative electrode. Further, a desired negative electrode can be obtained by pressurizing the current collector and the electrode mixed material layer by roll pressing or the like to be brought into close contact with each other.

The method for producing the battery in the present embodiment is not particularly limited, but a conventionally known secondary battery production method may be used, and the battery can also be produced, for example, by the following method. That is, a battery can be produced by disposing a polyolefin microporous membrane serving as an insulating layer between the positive electrode and the negative electrode, and injecting a non-aqueous electrolytic solution until the non-aqueous electrolytic solution sufficiently permeates into voids of the positive electrode, the negative electrode, and the polyolefin microporous membrane.

The use applications of the battery in the present embodiment are not particularly limited, and the battery can be used, for example, in a wide range of fields of portable AV devices such as digital cameras, video cameras, portable audio players, and portable liquid crystal display televisions; portable information terminals such as notebook computers, smartphones, and mobile PCs; and others such as portable game machines, power tools, electric bicycles, hybrid cars, electric cars, and power storage systems.

EXAMPLES

Hereinafter, the present invention will be more specifically described on the basis of Examples. However, the present invention is not limited to Examples below.

Example 1

(Carbon Black)

Carbon black was produced by supplying acetylene at 12 $Nm^3/h$, toluene at 32 kg/h, and oxygen at 22 $Nm^3/h$, which were raw materials, from a nozzle installed upstream of a carbon black reaction furnace (furnace length: 6 m, furnace diameter: 0.65 m), and collected by a bag filter installed downstream of the reaction furnace. Thereafter, the collected carbon black was passed through a dry cyclone device and an iron removal magnet and recovered in a tank. Note that, acetylene, toluene, and oxygen were heated to 115° C. and then supplied to the reaction furnace, thereby obtaining Carbon black A. The obtained Carbon black A had a BET specific surface area of 240 $m^2/g$, an average primary particle size of 20 nm, and a crystallite size (Lc) of 16 Å.

Carbon black A was set in a evolved gas mass spectrometer (GC/MS: manufactured by SHIMADZU CORPORATION, QP-2010, pyrolyzer: manufactured by Frontier Laboratories Ltd., Py-2020iD), maintained at 50° C. for 5 minutes in an atmospheric pressure He flow, and heated to 800° C. at 80° C./min, the mass spectrometry of the component desorbed by the temperature increase was performed under the following conditions, and the peak area $S_1$ of the peak with mass number m/z57 and the peak area $S_2$ of the peak with mass number m/z128 of the obtained Carbon black A were measured. The ratio ($S_2/S_1$) was calculated from the measured peak area $S_1$ of the peak with mass number m/z57 and the measured peak area $S_2$ of the peak with mass number m/z128 of Carbon black A, and was found to be 0.40.

Column: Ultra ALLOY-D™ (length: 2.5 m, 0.15 mm I.D, 0.47 mm O.D) manufactured by Frontier Laboratories Ltd.
Sample introduction temperature: 300° C.
Column temperature: 300° C., held for 80 minutes
Split ratio: 30:1
Column flow rate: 1.0 mL/min
Ionization method: EI
Measurement mass number range: m/z=10 to 200

(Carbon Black Slurry)

Carbon black A, N-methyl-2-pyrrolidone (described as NMP) as a dispersion medium, and polyvinyl alcohol (manufactured by Denka Company Limited, POVAL B05) as a dispersant were prepared. 1.0% by mass of polyvinyl alcohol and 10.0% by mass of Carbon black A were added to 89.0% by mass of NMP and stirred with a planetary mixer (manufactured by PRIMIX Corporation, HIVIS DISPER MIX 3D-5 type) for 120 minutes to prepare a slurry containing Carbon black A. The obtained slurry was charged into a bead mill (manufactured by Ashizawa Finetech Ltd., Mugenflow MGF2-ZA) equipped with zirconia beads (diameter: 0.5 mm), and a dispersion treatment was performed. After performing the dispersion treatment, the zirconia beads were removed by filtration to prepare a slurry of Carbon black A.

(Positive Electrode Composition)

The slurry of Carbon black A prepared using Carbon black A, and an NMP dispersion of carbon nanotubes (manufactured by Jiangsu Cnano Technology Co., Ltd., "Flotube 6000") having an average diameter of 6 nm, a BET specific surface area of 300 $m^2/g$, and an average diameter/a BET specific surface area of 0.02 were prepared. Furthermore, lithium nickel manganese cobalt oxide (manufactured by Beijing Easpring Material Technology Co., Ltd., "ME6E") having an average particle diameter $D_{50}$ of 10 μm as an active material, an NMP solution of polyvinylidene fluoride (manufactured by KUREHA CORPORATION, "L #7208") as a binding material, and NMP as a dispersion medium were prepared. The active material, the carbon black, the carbon nanotubes, and the binding material were prepared to have contents of 97.0% by mass, 0.7% by mass, 0.3% by mass, and 2.0% by mass in terms of solid ratio, respectively, and NMP was added until the viscosity suitable for coating was obtained, and mixed using a rotation/revolution type mixer (manufactured by THINKY CORPORATION, THINKY MIXER ARV-310) until a homogeneous state was obtained, thereby obtaining a positive electrode composition.

(Positive Electrode)

The produced positive electrode composition (NMP dispersion) was deposited on one surface of an aluminum foil (manufactured by UACJ Corporation) having a thickness of 15 μm using an applicator to produce a laminate, and the laminate was left to stand still in a dryer and pre-dried at 105° C. for 1 hour to completely remove NMP. Next, the dried laminate was pressed using a roll press at a linear pressure of 200 kg/cm to adjust a total thickness of the laminate to 80 μm. Next, the laminate was vacuum-dried at 170° C. for 3 hours to completely remove residual moisture, thereby obtaining a positive electrode including a current collector and a mixed material layer.

(Negative Electrode)

Pure water (manufactured by KANTO CHEMICAL CO., INC.) as a solvent, artificial graphite (manufactured by Hitachi Chemical Company, Ltd., "MAG-D") as a negative electrode active material, styrene-butadiene rubber (manufactured by Zeon Corporation, "BM-400B", described as "SBR" hereinafter) as a binding material, and carboxymethylcellulose (manufactured by Daicel Corporation, "D2200", described as "CMC" hereinafter) as a dispersant were prepared. Next, CMC and artificial graphite were weighed and mixed so that the solid content of CMC was 1% by mass and the solid content of artificial graphite was 97% by mass, and pure water was added to this mixture and mixed using a rotation/revolution type mixer (manufactured by THINKY CORPORATION, THINKY MIXER ARV-310) until a homogeneous state was obtained, thereby obtaining a mixture. Next, SBR was weighed so that the solid content was 2% by mass, added to the obtained mixture, and mixed using a rotation/revolution type mixer (manufactured by THINKY CORPORATION, THINKY MIXER ARV-310) until a homogeneous state was obtained, thereby obtaining a negative electrode composition. Next, the negative electrode composition was deposited on a copper foil (manufactured by UACJ Corporation) having a thickness of 10 μm using an applicator to produce a laminate, and the laminate was left to stand still in a dryer and pre-dried at 60° C. for 1 hour. Next, the laminate was pressed using a roll press at a linear pressure of 50 kg/cm to adjust a total thickness of the laminate to 60 μm. Next, the laminate was vacuum-dried at 120° C. for 3 hours to completely remove residual moisture, thereby obtaining a negative electrode including a current collector and a mixed material layer.

(Battery)

In a dry room controlled to a dew point of −50° C. or lower, the produced positive electrode was processed to 40×40 mm, the produced negative electrode was processed to 44×44 mm, and then an aluminum tab and a nickel tab were welded to the positive electrode and the negative electrode, respectively. A polyolefin microporous membrane processed to 45×45 mm was disposed between the positive electrode and the negative electrode so that mixed material-coated surfaces of the positive electrode and the negative electrode faced each other at the center. Next, a sheet-shaped exterior package cut and processed into 70×140 mm square was folded in half at the center part of the long side. Next, while the exterior package was disposed so that the aluminum tab for the positive electrode and the nickel tab for the negative electrode were exposed to the outside of the exterior package, the laminate of the positive electrode/the polyolefin microporous membrane/the negative electrode was sandwiched by the exterior package folded in half. Next, using a heat sealer, the two sides of the exterior package including the side where the aluminum tab for the positive electrode and the nickel tab for the negative electrode were exposed were heated and fused, 2 g of an electrolytic solution (manufactured by KISHIDA CHEMICAL Co., Ltd., a solution containing ethylene carbonate/diethyl carbonate=1/2 (volume ratio) and a 1 M $LiPF_6$ solution) was injected from one side not heated and fused to sufficiently permeate the electrolytic solution into the positive electrode, the negative electrode, and the polyolefin microporous membrane, and the remaining side of the exterior package was heated and fused with a vacuum heat sealer while the vacuuming the interior of the exterior package, thereby obtaining a lithium ion secondary battery.

Example 2

Carbon black was produced by supplying acetylene at 12 $Nm^3/h$, toluene at 32 kg/h, and oxygen at 21 $Nm^3/h$, which were raw materials, from a nozzle installed upstream of a carbon black reaction furnace (furnace length: 6 m, furnace diameter: 0.65 m), and collected by a bag filter installed downstream of the reaction furnace. Thereafter, the collected carbon black was passed through a dry cyclone device and an iron removal magnet and recovered in a tank. Note that, acetylene, toluene, and oxygen were heated to 115° C. and then supplied to the reaction furnace, thereby obtaining Carbon black B. The obtained Carbon black B had a BET specific surface area of 178 $m^2/g$, an average primary particle size of 22 nm, and a crystallite size (Lc) of 17 Å. Furthermore, the ratio ($S_2/S_1$) of Carbon black B was calculated by the same method as in Carbon black A, and was found to be 0.44.

A battery was produced by the same method as in Example 1, except that Carbon black A of Example 1 was changed to Carbon black B.

Example 3

A battery was produced by the same method as in Example 1, except that the NMP dispersion of the carbon nanotubes of Example 1 was changed to an NMP dispersion of carbon nanotubes (manufactured by Jiangsu Cnano Technology Co., Ltd., "Flotube 7000") having an average diameter of 9 nm, a BET specific surface area of 250 $m^2/g$, and an average diameter/a BET specific surface area of 0.036.

Example 4

A battery was produced by the same method as in Example 1, except that Carbon black A of Example 1 was changed to carbon black (manufactured by Denka Company Limited, "Li-435") having a BET specific surface area of 133 $m^2/g$, an average primary particle size of 26 nm, and a crystallite size (Lc) of 25 Å. Furthermore, the ratio ($S_2/S_1$) of Carbon black Li-435 was calculated by the same method as in Carbon black A, and was found to be 0.23.

Example 5

Carbon black was produced by supplying acetylene at 12 $Nm^3/h$, toluene at 32 kg/h, and oxygen at 20 $Nm^3/h$, which were raw materials, from a nozzle installed upstream of a carbon black reaction furnace (furnace length: 6 m, furnace diameter: 0.65 m), and collected by a bag filter installed downstream of the reaction furnace. Thereafter, the collected carbon black was passed through a dry cyclone device and an iron removal magnet and recovered in a tank. Note that, acetylene, toluene, and oxygen were heated to 115° C. and then supplied to the reaction furnace, thereby obtaining Carbon black C. The obtained Carbon black C had a BET specific surface area of 165 $m^2/g$, an average primary particle size of 23 nm, and a crystallite size (Lc) of 18 Å. Furthermore, the ratio ($S_2/S_1$) of Carbon black C was calculated by the same method as in Carbon black A, and was found to be 0.42.

A battery was produced by the same method as in Example 1, except that Carbon black A of Example 1 was changed to Carbon black C.

Example 6

A battery was produced by the same method as in Example 1, except that the NMP dispersion of the carbon nanotubes of Example 1 was changed to an NMP dispersion of carbon nanotubes (manufactured by Jiangsu Cnano Technology Co., Ltd., "Flotube 9000") having an average diameter of 12 nm, a BET specific surface area of 180 $m^2/g$, and an average diameter/a BET specific surface area of 0.067.

Example 7

A battery was produced by the same method as in Example 1, except that the addition amounts of the carbon black and the carbon nanotubes were changed so that the content of the carbon black was 0.5% by mass and the content of the carbon nanotubes was 0.5% by mass on the basis of the total mass of the solid contents in the positive electrode composition.

Example 8

A battery was produced by the same method as in Example 1, except that the addition amounts of the carbon black and the carbon nanotubes were changed so that the content of the carbon black was 0.9% by mass and the content of the carbon nanotubes was 0.1% by mass on the basis of the total mass of the solid contents in the positive electrode composition.

Example 9

Carbon black was produced by supplying acetylene at 12 $Nm^3/h$, toluene at 32 kg/h, and oxygen at 26 $Nm^3/h$, which were raw materials, from a nozzle installed upstream of a carbon black reaction furnace (furnace length: 6 m, furnace diameter: 0.65 m), and collected by a bag filter installed downstream of the reaction furnace. Thereafter, the collected carbon black was passed through a dry cyclone device and an iron removal magnet and recovered in a tank. Note that, acetylene, toluene, and oxygen were heated to 115° C. and then supplied to the reaction furnace, thereby obtaining Carbon black D. The obtained Carbon black D had a BET specific surface area of 370 $m^2/g$, an average primary particle size of 18 nm, and a crystallite size (Lc) of 20 Å. Furthermore, the ratio ($S_2/S_1$) of Carbon black D was calculated by the same method as in Carbon black A, and was found to be 0.25.

A battery was produced by the same method as in Example 1, except that the carbon black of Example 1 was changed to Carbon black D.

Example 10

A battery was produced by the same method as in Example 1, except that the active material of Example 1 was changed to lithium cobalt oxide (manufactured by Umicore, "KD-20") having an average particle diameter $D_{50}$ of 20 μm, and the addition amounts of the carbon black and the carbon nanotubes were changed so that the content of the carbon black was 0.9% by mass and the content of the carbon nanotubes was 0.1% by mass on the basis of the total mass of the solid contents in the positive electrode composition.

Example 11

A battery was produced by the same method as in Example 1, except that Carbon black A of Example 1 was changed to Carbon black B, the NMP dispersion of the carbon nanotubes of Example 1 was changed to an NMP dispersion of carbon nanotubes (manufactured by Jiangsu Cnano Technology Co., Ltd., "Flotube 7000") having an average diameter of 9 nm, a BET specific surface area of 250 $m^2/g$, and an average diameter/a BET specific surface area of 0.036, and the addition amounts of the carbon black and the carbon nanotubes were changed so that the content of the carbon black was 0.1% by mass and the content of the carbon nanotubes was 0.9% by mass on the basis of the total mass of the solid contents in the positive electrode composition.

Comparative Example 1

A battery was produced by the same method as in Example 1, except that the carbon black of Example 1 was changed to carbon black (manufactured by Imerys Graphite & Carbon, "SuperPLi") having a BET specific surface area of 62 $m^2/g$, an average primary particle size of 36 nm, and a crystallite size (Lc) of 20 Å. Furthermore, the ratio $(S_2/S_1)$ of Carbon black SuperPLi was calculated by the same method as in Carbon black A, and was found to be 1.12.

Comparative Example 2

A battery was produced by the same method as in Example 1, except that the carbon black of Example 1 was changed to carbon black (manufactured by Cabot Corporation, "LiTX-HP") having a BET specific surface area of 87 $m^2/g$, an average primary particle size of 25 nm, and a crystallite size (Lc) of 23 Å. Furthermore, the ratio $(S_2/S_1)$ of Carbon black LiTX-HP was calculated by the same method as in Carbon black A, and was found to be 1.28.

Comparative Example 3

A battery was produced by the same method as in Example 1, except that Carbon black A of Example 1 was changed to Carbon black C and carbon nanotubes were not used.

Comparative Example 4

A battery was produced by the same method as in Example 1, except that the NMP dispersion of the carbon nanotubes of Example 1 was changed to an NMP dispersion of carbon nanotubes (manufactured by Jiangsu Cnano Technology Co., Ltd., "Flotube 7000") having an average diameter of 9 nm, a BET specific surface area of 250 $m^2/g$, and an average diameter/a BET specific surface area of 0.036, and carbon black was not used.

Comparative Example 5

A battery was produced by the same method as in Example 1, except that the carbon black of Example 1 was changed to carbon black (manufactured by Lion Corporation, "ECP") having a BET specific surface area of 820 $m^2/g$, an average primary particle size of 40 nm, and a crystallite size (Lc) of 16 Å. Furthermore, the ratio $(S_2/S_1)$ of Carbon black ECP was calculated by the same method as in Carbon black A, and was found to be 2.06.

Comparative Example 6

A battery was produced by the same method as in Example 1, except that the NMP dispersion of the carbon nanotubes of Example 1 was changed to an NMP dispersion of carbon nanotubes (manufactured by Nanocyl SA, "NC7000") having an average diameter of 12 nm, a BET specific surface area of 175 $m^2/g$, and an average diameter/a BET specific surface area of 0.069.

Comparative Example 7

A battery was produced by the same method as in Example 1, except that the NMP dispersion of the carbon nanotubes of Example 1 was changed to an NMP dispersion of carbon nanotubes (manufactured by Tokyo Chemical Industry Co., Ltd., "MWNT") having an average diameter of 32 nm, a BET specific surface area of 110 $m^2/g$, and an average diameter/a BET specific surface area of 0.29.

Comparative Example 8

A battery was produced by the same method as in Example 1, except that the carbon black of Example 1 was changed to carbon black (manufactured by Orion S.A., "YS") having a BET specific surface area of 120 $m^2/g$, an average primary particle size of 26 nm, and a crystallite size (Lc) of 27 Å. Furthermore, the ratio $(S_2/S_1)$ of Carbon black YS was calculated by the same method as in Carbon black A, and was found to be 0.92.

Comparative Example 9

A battery was produced by the same method as in Example 1, except that the carbon black of Example 1 was changed to carbon black (manufactured by Cabot Corporation, "BLACK PEARLS 1000") having a BET specific surface area of 343 $m^2/g$, an average primary particle size of 16 nm, and a crystallite size (Lc) of 14 Å. Furthermore, the ratio $(S_2/S_1)$ of Carbon black BLACK PEARLS 1000 was calculated by the same method as in Carbon black A, and was found to be 3.42.

Comparative Example 10

A battery was produced by the same method as in Example 1, except that the NMP dispersion of the carbon nanotubes of Example 1 was changed to an NMP dispersion of carbon nanotubes (manufactured by Sigma-Aldrich, "SignisFW100") having an average diameter of 2.5 nm, a BET specific surface area of 740 $m^2$/g, and an average diameter/a BET specific surface area of 0.003, and the addition amounts of the carbon black and the carbon nanotubes were changed so that the content of the carbon black was 0.9% by mass and the content of the carbon nanotubes was 0.1% by mass on the basis of the total mass of the solid contents in the positive electrode composition.

The battery performance of the produced lithium ion secondary battery was evaluated using the following method.

(Evaluation of Battery)

[Internal Resistance]

The produced battery was charged with a constant current and constant voltage limited to 4.3 V and 0.2 C at 25° C. and then discharged to 3.0 V at a constant current of 0.2 C. Next, the battery was charged/discharged for 5 cycles under the same conditions, and then charged so that the depth of charge was 50%. Thereafter, impedance measurement was performed in a frequency range of 10 MHz to 0.001 Hz at an oscillation voltage of 5 mV to measure the internal resistance. The measurement results of the internal resistance are shown in Tables 1 to 4.

[Discharge Rate Characteristics (Percent Rate Capacity Retention)]

The produced battery was charged with a constant current and constant voltage limited to 4.3 V and 0.2 C at 25° C. and then discharged to 3.0 V at a constant current of 0.2 C. Next, the battery was recovery charged with a constant current and constant voltage limited to 4.3 V and 0.2 C again, and then discharged to 3.0 V at a constant current of 0.2 C, and the discharge capacity at this time was measured. Next, while the battery was charged with a constant current and constant voltage limited to 4.3 V and 0.2 C set as the recovery charging conditions, and the discharge current was changed stepwise to 0.5 C, 1 C, 2 C, and 3 C, the recovery charging and discharging were repeated, and the discharge capacity with respect to each discharge current was measured. As an index of discharge rate characteristics of the battery, the capacity retention rate of a capacity discharged at 3 C with respect to that discharged at 0.2 C was calculated as percent rate capacity retention. The calculation results of the percent rate capacity retention are shown in Tables 1 to 4.

[Cycle Characteristics (Percent Cycle Capacity Retention)]

The produced battery was charged with a constant current and constant voltage limited to 4.3 V and 1 C at 25° C. and then discharged to 3.0 V at a constant current of 1 C. The above-described charging and discharging were repeated for 500 cycles, and the discharge capacity at each cycle was measured. As an index of cycle characteristics of the battery, the capacity retention rate after 500 cycles with respect to the capacity retention rate after 1 cycle was calculated as percent cycle capacity retention. The calculation results of the percent cycle capacity retention are shown in Tables 1 to 4.

TABLE 1

| Composition | | Example 1 | Example 2 | Example 3 | Example 4 | Example 5 | Example 6 |
|---|---|---|---|---|---|---|---|
| Carbon black | Type | Carbon black A | Carbon black B | Carbon black A | Li-435 | Carbon black C | Carbon black A |
| | BET specific surface area ($m^2$/g) | 240 | 178 | 240 | 133 | 165 | 240 |
| | Average primary particle size (nm) | 20 | 22 | 20 | 26 | 23 | 20 |
| | Crystallite size Lc (Å) | 16 | 17 | 16 | 25 | 18 | 16 |
| | Ratio ($S_2/S_1$) | 0.4 | 0.44 | 0.4 | 0.23 | 0.42 | 0.4 |
| Carbon nanotubes | Type | Flotube 6000 | Flotube 6000 | Flotube 7000 | Flotube 6000 | Flotube 6000 | Flotube 9000 |
| | Average diameter (nm) | 6 | 6 | 9 | 6 | 6 | 12 |
| | BET specific surface area ($m^2$/g) | 300 | 300 | 250 | 300 | 300 | 180 |
| | Average diameter/BET specific surface area | 0.02 | 0.02 | 0.036 | 0.02 | 0.02 | 0.067 |
| Content (% by mass) of carbon black | | 70 | 70 | 70 | 70 | 70 | 70 |
| Evaluation | Internal resistance (Ω) | 1.48 | 1.59 | 1.51 | 1.64 | 1.63 | 1.61 |
| | Percent rate capacity retention (%) | 96.4 | 91.4 | 95.8 | 88.2 | 88.1 | 90.5 |
| | Percent cycle capacity retention (%) | 93.2 | 90.1 | 92.1 | 87.2 | 88.4 | 89.5 |

TABLE 2

| Composition | | Example 7 | Example 8 | Example 9 | Example 10 | Example 11 |
|---|---|---|---|---|---|---|
| Carbon black | Type | Carbon black A | Carbon black A | Carbon black D | Carbon black A | Carbon black B |
| | BET specific surface area ($m^2$/g) | 240 | 240 | 370 | 240 | 178 |
| | Average primary particle size (nm) | 20 | 20 | 18 | 20 | 22 |
| | Crystallite size Lc (Å) | 16 | 16 | 20 | 16 | 17 |
| | Ratio ($S_2/S_1$) | 0.4 | 0.4 | 0.25 | 0.4 | 0.44 |
| Carbon nanotubes | Type | Flotube 6000 | Flotube 6000 | Flotube 6000 | Flotube 6000 | Flotube 7000 |
| | Average diameter (nm) | 6 | 6 | 6 | 6 | 9 |
| | BET specific surface area ($m^2$/g) | 300 | 300 | 300 | 300 | 250 |
| | Average diameter/BET specific surface area | 0.02 | 0.02 | 0.02 | 0.02 | 0.036 |
| Content (% by mass) of carbon black | | 50 | 90 | 70 | 90 | 10 |
| Evaluation | Internal resistance (Ω) | 1.52 | 1.53 | 1.46 | 1.68 | 1.67 |
| | Percent rate capacity retention (%) | 95.1 | 94.9 | 96.5 | 91.5 | 87.8 |
| | Percent cycle capacity retention (%) | 92.4 | 92.1 | 92.3 | 92.2 | 86.9 |

TABLE 3

| | | Comparative Example 1 | Comparative Example 2 | Comparative Example 3 | Comparative Example 4 | Comparative Example 5 | Comparative Example 6 |
|---|---|---|---|---|---|---|---|
| Carbon black | Type | SuperPLi | LiTX-HP | Carbon black C | — | ECP | Carbon black A |
| | BET specific surface area ($m^2/g$) | 62 | 87 | 165 | — | 820 | 240 |
| | Average primary particle size (nm) | 36 | 25 | 23 | — | 40 | 20 |
| | Crystallite size Lc (Å) | 20 | 23 | 18 | — | 16 | 16 |
| | Ratio ($S_2/S_1$) | 1.12 | 1.28 | 0.42 | — | 2.06 | 0.4 |
| Carbon nanotubes | Type | Flotube 6000 | Flotube 6000 | — | Flotube 7000 | Flotube 6000 | NC7000 |
| | Average diameter (nm) | 6 | 6 | — | 9 | 6 | 12 |
| | BET specific surface area ($m^2/g$) | 300 | 300 | — | 250 | 300 | 175 |
| | Average diameter/BET specific surface area | 0.02 | 0.02 | — | 0.036 | 0.02 | 0.069 |
| Content (% by mass) of carbon black | | 70 | 70 | 100 | 0 | 70 | 70 |
| Evaluation | Internal resistance (Ω) | 2.47 | 2.39 | 1.84 | 1.82 | 1.72 | 1.85 |
| | Percent rate capacity retention (%) | 62.4 | 68.7 | 79.8 | 80.1 | 84.2 | 79.4 |
| | Percent cycle capacity retention (%) | 63.5 | 70.2 | 80.2 | 84.9 | 83.8 | 81.3 |

TABLE 4

| | | Comparative Example 7 | Comparative Example 8 | Comparative Example 9 | Comparative Example 10 |
|---|---|---|---|---|---|
| Carbon black | Type | Carbon black A | YS | BLACK PEARLS 1000 | Carbon black A |
| | BET specific surface area ($m^2/g$) | 240 | 120 | 343 | 240 |
| | Average primary particle size (nm) | 20 | 26 | 16 | 20 |
| | Crystallite size Lc (Å) | 16 | 27 | 14 | 16 |
| | Ratio ($S_2/S_1$) | 0.4 | 0.92 | 3.42 | 0.4 |
| Carbon nanotubes | Type | MWNT | Flotube 6000 | Flotube 6000 | SignisFW100 |
| | Average diameter (nm) | 32 | 6 | 6 | 2.5 |
| | BET specific surface area ($m^2/g$) | 110 | 300 | 300 | 740 |
| | Average diameter/ BET specific surface area | 0.29 | 0.02 | 0.02 | 0.003 |
| Content (% by mass) of carbon black | | 70 | 70 | 70 | 90 |
| Evaluation | Internal resistance (Ω) | 1.98 | 1.79 | 2.08 | 1.95 |
| | Percent rate capacity retention (%) | 74.2 | 81.1 | 71.4 | 78.3 |
| | Percent cycle capacity retention (%) | 76.3 | 80.5 | 73.5 | 76.2 |

From the results of Tables 1 to 4, it was confirmed that the battery produced using the positive electrode composition of the aforementioned embodiment had low internal resistance and excellent discharge rate characteristics and cycle characteristics.

The invention claimed is:

1. A positive electrode composition comprising carbon black, carbon nanotubes, an active material, and a binding material, wherein the carbon black has a BET specific surface area of 170 to 400 $m^2/g$ and a crystallite size (Lc) of 15 to 26 Å, and wherein an average primary particle size of the carbon black is 17 to 30 nm, the carbon nanotubes have an average diameter of 5 to 15 nm, and a ratio (average diameter/BET specific surface area) of the average diameter with respect to a BET specific surface area of the carbon nanotubes is 0.01 to 0.068 nm/($m^2$/g).

2. The positive electrode composition according to claim 1, wherein a ratio ($S_2/S_1$) of a peak area ($S_2$) of a peak with mass number m/z128 with respect to a peak area ($S_1$) of a peak with mass number m/z57 as detected by a temperature-programmed desorption gas analysis method of the carbon black is 0.2 to 1.9.

3. The positive electrode composition according to claim 1, wherein the crystallite size (Lc) of the carbon black is 15 to 20 Å.

4. The positive electrode composition according to claim 1, wherein the average diameter of the carbon nanotubes is 5 to 10 nm.

5. The positive electrode composition according to claim 1, wherein a content of the carbon black is 40 to 90% by mass on the basis of the total content of the carbon black and the carbon nanotubes.

6. A positive electrode comprising the positive electrode composition according to claim 1.

7. A battery comprising the positive electrode according to claim 6.

* * * * *